(12) United States Patent
Koyanaka et al.

(10) Patent No.: US 7,335,622 B2
(45) Date of Patent: Feb. 26, 2008

(54) MANGANESE/OXYGEN COMPOUND WITH ARSENIC ADSORPTION

(75) Inventors: Hideki Koyanaka, Oita (JP); Toshihiro Kasai, Fukui (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/473,890

(22) PCT Filed: Oct. 19, 2001

(86) PCT No.: PCT/JP01/09216

§ 371 (c)(1),
(2), (4) Date: Dec. 12, 2003

(87) PCT Pub. No.: WO02/081376

PCT Pub. Date: Oct. 17, 2002

(65) Prior Publication Data

US 2004/0109821 A1   Jun. 10, 2004

(30) Foreign Application Priority Data

Apr. 2, 2001 (JP) ............................. 2001-103988
Sep. 12, 2001 (JP) ............................. 2001-277169

(51) Int. Cl.
*B01J 20/00* (2006.01)
(52) U.S. Cl. .................................................. 502/400
(58) Field of Classification Search ................ 423/87, 423/88; 502/400, 324, 353
See application file for complete search history.

(56) References Cited

U.S. PATENT DOCUMENTS

| 4,222,897 | A | * | 9/1980 | Rollmann | ................... 502/400 |
| 5,419,986 | A | | 5/1995 | Kainthla | |
| 5,948,726 | A | * | 9/1999 | Moskovitz et al. | ......... 502/415 |
| 6,476,287 | B1 | * | 11/2002 | Hale et al. | ................... 588/315 |

FOREIGN PATENT DOCUMENTS

| JP | 8-267053 | 10/1996 |
| JP | 2000-325779 | 11/2000 |

OTHER PUBLICATIONS

Otojiro Miyamoto et al., "Removal of As and Separation of the same from As-Mn Precipitates using $MnO_2$", presented at the Oct. 1972 and 1973 Autumn Meeting of the Mining Metallurgical Institute of Japan, pp. 33-38.

* cited by examiner

*Primary Examiner*—Edward M. Johnson
(74) *Attorney, Agent, or Firm*—Wenderoth, Lind & Ponack, L.L.P.

(57) ABSTRACT

A novel technique that is able to efficiently remove, in addition to pentavalent arsenic, trivalent arsenic that has been considered to be difficult to remove. By using a manganese oxygen compound which is characterized by being a product of burning or heating which comprises an oxygen compound of bismuth and an oxygen compound of manganese and by containing manganese as a major component, an aqueous arsenic solution is treated to adsorptively remove the arsenic.

13 Claims, 13 Drawing Sheets

Fig. 1

MIXED WEIGHT RATIO OF OXIDIZED BISMUTH
CARBONATE TO MANGANESE CARBONATE
$MnCO_3 : Bi_2(CO_3)O_2 = 1 : X$
Burning temperature of adsorbent, 400°C
Aqueous arsenic solution Ph, 4.5
Volume of aqueous arsenic solution, 1L
Concentration of arsenic, 10 mg/L

INITIAL pH
Burning temperature of adsorbent, 200°C
Volume of aqueous arsenic solution, 2L
Concentration of arsenic, 20 mg/L

CONCENTRATION OF ARSENIC (mg/L)
Adsorbent burning temperature, 200 °C
Aqueous arsenic solution, pH 4.5
Volume of aqueous arsenic solution, 2L

MANGANESE/OXYGEN COMPOUND WITH ARSENIC ADSORPTION

TECHNICAL FIELD

The invention of the present application relates to a manganese oxygen compound with arsenic sorbability, arsenic adsorbent, and a method of adsorption and removal of arsenic in solution.

BACKGROUND ART

Pollution of rivers and water area such as lakes and marshlands by arsenic is prevailing in Japan and foreign countries, and examples in Bangladesh have been widely reported. Soils in this country are abundant in arsenic, and skin failures and diseases by arsenic are often seen in inhabitants in the country using well water polluted with arsenic as drinking water. While the concentration of arsenic is supposed to reach 0.01 to 1 mg/liter (0.01 mg/liter according to the water quality standard by WhO) in Nawabganj district where the damage is reported to be most serious in Bangladesh, no substantial countermeasures are taken today. On the other hand, pollution by arsenic in Japan is mainly caused by waste water from abandoned mines. The concentration of arsenic in the rivers around the mines ascribed to waste water from tunnels after closing the mines has been reported to be 0.08 to 1.3 mg/liter, which exceeds the environmental standard, around Sasagatani Mine in Shimane Prefecture. In the surrounding area of former Horobetu Sulfur Mine in Hokkaido, the concentration of arsenic in the river had exceeded far above the environmental standard before 1975 due to efflux of strongly acidic water containing a large quantity of arsenic into Benkei River. On the other hand, it was reported that the original arsenic concentration of 0.2 mg/liter had decreased to about $1/10$ of 0.02 mg/liter since 1981 thanks to countermeasures to pollution by mining including blocking of entrance of tunnels and installation of a neutralization plant for mine water effected by Sobetsu Town. However, the total amount of use of lime cakes, slaked lime and calcium carbonate used for neutralization and removal of arsenic by coprecipitation in this plant annually accounts for 40,000 to 50,000 tons, and it has been a large problem to ensure landfill sites of a vast amount of precipitates generated from the neutralization plant, and to cover the expense of about 300 million yen per year. There are many water pollution problems by arsenic such as those ascribed to waste water from geothermal power plants and industrial waste other than the problems above. However, since the currently prevailing coprecipitation method involves the problems of waste disposal and treatment cost, treatments by arsenic adsorbents have been expected as substitutes of the arsenic processing method. Particularly, developments of novel adsorbents that can directly adsorb trivalent arsenic are considered to be valuable in establishing an economically advantageous arsenic removal technique, because the process for oxidizing trivalent arsenic into pentavalent arsenic that is relatively easily adsorbed by adding an oxidizing agent may be omitted.

The object of the present invention for solving the conventional technical problems is to provide a novel technique that is able to efficiently remove, to say nothing of pentavalent arsenic, trivalent arsenic that has been considered to be difficult to remove.

DISCLOSURE OF INVENTION

In order to solve the above problem, firstly, the present invention provides a manganese oxygen compound with arsenic sorbability characterized by being a product of burning or heating which comprises an oxygen compound of bismuth and an oxygen compound of manganese and by containing manganese as a major component.

Further, secondly, the present invention provides the manganese oxygen compound with arsenic sorbability, characterized in that a compound of manganese in which a compound of bismuth is added is burned or heated in the atmosphere or an atmosphere containing oxygen. Further, thirdly, the present invention provides a manganese oxygen compound with arsenic sorbability, characterized in that the product of burning or heating is an acid-treated product.

Preferably, fourthly, the present invention provides the manganese oxygen compound with arsenic sorbability, characterized in that a mixture of oxidized bismuth carbonate powder, and manganese carbonate powder is burned or heated at a temperature of 150° C. to 400° C. Fifthly, the present invention provides the manganese oxygen compound with arsenic sorbability, characterized in that a mixture of oxidized bismuth carbonate and manganese carbonate is in the range of 0.05:1 to 1:1.

Sixthly, the present invention provides an arsenic adsorbent characterized by comprising the oxygen compound of manganese according to any one of the above oxygen compounds of manganese, or a compound containing these oxygen compounds of manganese. Seventhly, the present invention provides an arsenic adsorbent characterized by comprising the manganese oxygen compound retained on or filled in a carrier substance.

Further, eighthly, the present invention provides a method of adsorption and removal of arsenic in solution which comprises, contacting an arsenic adsorbent and an aqueous arsenic solution, and adsorbing and removing arsenic contained in solution. Further, ninthly, the present invention provides a method of reclaiming the arsenic adsorbent which comprises, performing an acid treatment to an arsenic adsorbent which adsorbed arsenic by the above method, making arsenic desorb into an acid solution, and enabling reclamation of the arsenic adsorbent.

As described above, the oxygen compound mainly containing manganese according to the present invention can solve the problem of low economical performance involved in conventional methods (except the adsorption method), while enabling trivalent arsenic, which has been technically difficult to efficiently remove by conventional adsorption methods, to be efficiently removed by adsorption in a quite short period of time. For example, the amount of adsorption of trivalent arsenic per one gram reaches 50 mg by using the adsorbent of the present invention. The invention also enables the adsorbent after adsorption of arsenic to be reclaimed by allowing the adsorbent to contact an acid solution such as dilute sulfuric acid to readily recover adsorbed arsenic into the acid solution.

It is an important feature of the present invention that the present invention is effective not only to arsenous acid as a trivalent arsenic but also to arsenic acid as a pentavalent arsenic. Since arsenic is usually dissolved in industrial waste water as pentavalent arsenic acid in most cases, the fact that the present invention is effective not only to the trivalent arsenous acid but also to the pentavalent arsenic acid means that the present invention has a wide applicability in treating waste water containing arsenic.

The adsorbent of the present invention exhibits excellent performance as described above while having an advantage that the concentration of electrolytes of the aqueous solution as an object of treatment is not required to be increased, which is also an advantage of water cleaning using an adsorbent. In other words, manganese and bismuth as the major components of the adsorbent are little dissolved in the aqueous arsenic solution as the object of treatment.

It has been a general method for retaining a powdery adsorbent to fill it in a column after granulation using PVC and the like. However, since bonding surfaces with PVC are formed in the conventional method, the contact area between the adsorbent particles and treating solution is reduced to consequently decrease the performance of the column. Accordingly, a novel technique for retaining the powdery adsorbent using fibrous carrier substances such as ashless pulp or glass wool has been developed in the present invention to improve the drawbacks of the conventional method.

BEST MODE FOR CARRYING OUT THE INVENTION

While the invention is featured as described above, embodiments thereof will be described hereinafter.

The oxide compound of manganese provided by the invention has an arsenic sorbability as its function. The compound contains an oxygen compound of bismuth (Bi) and an oxygen compound of manganese (Mn) with manganese as its major component.

This product of burning or heating refers to as a heated product, and means that the product is heated either by the heat of a chemical reaction induced by mixing base materials, by drying, or by a heat treatment accompanied by a chemical reaction. Burning, or heating is usually carried out at 100° C. or more, preferably in the temperature range of 150 to 500° C., and the oxygen compound of bismuth and the oxygen compound of manganese are involved by heating. The "oxygen compound" is, as well, defined as an oxide or an oxide as a complex oxygen compound, or a compound mainly comprising the oxygen compound and having oxygen containing groups such as carboxylate groups.

Various bismuth compounds and manganese compounds may be used as the base materials for forming the oxygen compound in the atmosphere or an atmosphere containing oxygen in burning or heating. The base material may be carboxylate, nitride, sulfate, organic acid salts and halides, and favorably used compounds are solids or powders. The material may be formed by precipitation by a sol-gel method.

In a representative example, oxidized bismuth carbonate powder and manganese carbonate powder are mixed, and the mixed powder or a molded body thereof is burned in the temperature range of 150 to 400° C., preferably 170 to 250° C. The mixing ratio of the base materials such as oxidized bismuth carbonate and manganese carbonate in the representative example is preferably 0.01:1 to 1:1 in the molar ratio of bismuth to manganese considering the arsenic adsorbing ability.

It is effective to activate the burned product by an acid treatment for preparing the arsenic adsorbent. Dilute nitric acid, sulfuric acid, hydrochloric acid and the like may be used for the acid treatment.

The arsenic adsorbent of the present invention may be retained on or filled in a carrier substance such as ashless pulp and glass wool for use in removal of arsenic in aqueous solution by adsorption.

Trivalent arsenic has been treated after converting it into readily treatable pentavalent arsenic by adding an oxidizing agent in the conventional art. However, it is a problem that water quality is deteriorated by increasing the electrolyte concentration in water while being low in cost performance. Accordingly, developments of adsorbents capable of directly treating trivalent arsenic in water have been desired. The present invention can realize a high performance, economically advantageous adsorption treatment of trivalent arsenic as well as pentavalent arsenic by the steps comprising burning the manganese compound by adding a small amount of a bismuth compound, and applying the obtained metal oxide containing manganese as a major component with a small amount of bismuth to waste water containing arsenic, desirably after an acid treatment. Adsorption of trivalent arsenic has been experimentally proved as arsenic in arsenous acid ($HAsO_2$) by measuring pH and redox potential of the aqueous arsenic solution.

A retention layer of the powdery adsorbent excellent in chemical resistance in repeated uses of the column may be obtained by using glass wool and the like as the carrier of the adsorbent. Incineration for disposal of the column in an incinerator after repeated uses of the column is possible by using ashless pulp as the carrier of the adsorbent. The ashless pulp accounting for the greater part of the volume of the retaining layer involving the powdery adsorbent is almost completely burnt up, and the residue only comprises the component of the adsorbent after incineration.

Accordingly, the present invention provides a novel adsorbent capable of efficiently adsorbing, to say nothing of pentavalent arsenic, trivalent arsenic that has been considered to be difficult to remove from an aqueous solution by the conventional art. The adsorbent has a high performance in which the maximum amount of arsenic per 1 g of the adsorbent reaches 50 mg or more.

The following procedure gives a largest effect in applying the adsorbent of the invention to an aqueous arsenic solution. This will be made apparent in the examples to be described hereinafter.

(a) Manganese carbonate powder ($MnCO_3$, reagent special grade) and oxidized bismuth carbonate powder ($Bi_2(CO_3)O_2$, reagent special grade) are mixed in a weight ratio of 1:0.1 to 1:0.2. A metal oxide containing bismuth and mainly containing manganese is synthesized by burning the mixture at 200° C. for 4 hours and 30 minutes using an electric furnace.

(b) The metal oxide containing bismuth and mainly containing manganese obtained in (a) is suspended in dilute nitric acid with a concentration of about 0.5 mol/liter to remove remaining carbonate components by vaporization. Then, the metal oxide is washed with pure water to remove adhered nitric acid.

(c) The sample obtained in (b) is dried at about 100° C. for 1 hour using a drying machine. The adsorbent is produced by the procedure above.

(d) The adsorbent is suspended in dilute nitric acid with a concentration of about 0.5 mol/liter followed by stirring for 30 minutes to 1 hour, filtered, washed with pure water, and suspended again in an aqueous arsenic solution for use as the adsorbent.

(e) After the concentration of arsenic in the aqueous arsenic solution has decreased to 0.1 mg/liter as a standard of waste water, the adsorbent is retrieved from the aqueous arsenic solution by, for example, filtration. Purified waste water becomes possible to discharge into a public water area.

(f) Adsorbed arsenic is desorbed and concentrated in dilute sulfuric acid by adding a small volume of dilute sulfuric acid with a concentration of 0.5 mol/liter or less to the adsorbent after adsorbing retrieved arsenic, followed by stirring for about 30 minutes.

(g) Since adsorption ability of the adsorbent after desorption of arsenic is recovered again, the adsorbent is used again by allowing it to contact the aqueous arsenic solution.

While the adsorbent is suspended in the aqueous arsenic solution as a powdery adsorbent in the example above, the adsorbent may be granulated or retained on a porous carrier, if necessary, to fill in a column for industrial applications in order to remove arsenic by passing the aqueous arsenic solution through the column.

While the invention will be described in more detail with reference to the examples, the invention is by no means restricted to the examples.

EXAMPLES

Example 1

Synthesis of Adsorbent and Adsorption of Arsenic (Synthesis of Adsorbent)

Manganese carbonate powder ($MnCO_3$, reagent special grade) and oxidized bismuth carbonate powder ($Bi_2(CO_3)O_2$, reagent special grade) were thoroughly mixed by changing the mixing ratios to several steps. About 20 g of each mixed powder was transferred to a ceramic crucible, and was burned at 400° C. for 4.5 hours using an electric furnace, followed by cooling to room temperature by allowing the crucible to stand still. The metal oxide obtained containing a small amount of bismuth and manganese as a major component after burning is used as an adsorbent for the arsenic adsorption experiment. The optimum mixing weight ratio between manganese carbonate ($MnCO_3$) powder and oxidized bismuth carbonate ($Bi_2(CO_3)O_2$) powder was determined for obtaining the highest amount of adsorption. The effect of adding bismuth was confirmed by comparing the adsorptive performance of manganese oxide, which was obtained by burning only manganese carbonate ($MnCO_3$) powder without mixing with oxidized bismuth carbonate ($Bi_2(CO_3)O_2$) powder, with the adsorptive performance of the adsorbent above.

Then, the sample was heated or burned by changing the temperatures to 150° C., 200° C., 250° C. and 300° C. for 4.5 hours followed by allowing the samples to cool to room temperature. The optimum burning temperature was investigated by arsenic adsorption experiments using each metal oxide obtained containing a small amount of bismuth and mainly containing manganese as the adsorbent.

(Experimental Method of Arsenic Adsorption)

An aqueous arsenic standard solution (made by Wako Pure Chemical Industries, Ltd.) containing a total concentration of trivalent arsenic of 1000 mg/liter prepared from a reagent ($As_2O_3$) was diluted with ion-exchange water to prepare 1000 ml each of arsenic solutions with concentrations of 10 mg/liter, 20 mg/liter or 40 mg/liter, and the solution was used for each experiment. The pH values of the arsenic solutions were adjusted using an aqueous sodium hydroxide solution. Subsequently, 1.0 g of the adsorbent obtained by each experiment above was weighed with an electronic balance, and was suspended in 1000 ml of 0.5 mol/liter of diluted nitric acid (may be diluted sulfuric acid or hydrochloric acid) followed by stirring for 1 hour. After stirring, the suspension was filtered with suction using a glass fiber filtration paper (GS25, made by Toyo Roshi Kaisha, Ltd.) with a pore size of 0.6 mm, followed by washing by allowing 1000 ml of ion-exchange water to flow through (this process is called as an acid treatment hereinafter) The activated adsorbent obtained by the acid treatment was suspended in an arsenic aqueous solution followed by stirring for 1 hour. Twenty milliliters each of the aqueous arsenic solutions were sampled at 5, 10, 20, 30 and 60 minutes after the start of stirring. A disposable membrane filter (DISMIC-25 made by Toyo Roshi Kaisha, Ltd.) with a pore size of 0.2 μm was used for filtration. The concentration of arsenic in each filtered sample was measured with an ICP atomic emission analyzer (ICPS-1000III made by Shimadzu Corporation) to obtain time dependent changes of the arsenic concentration in the aqueous arsenic solution.

(Amount of Adsorption of Arsenic and Mixing Ratio of Base Material)

Figure 1:
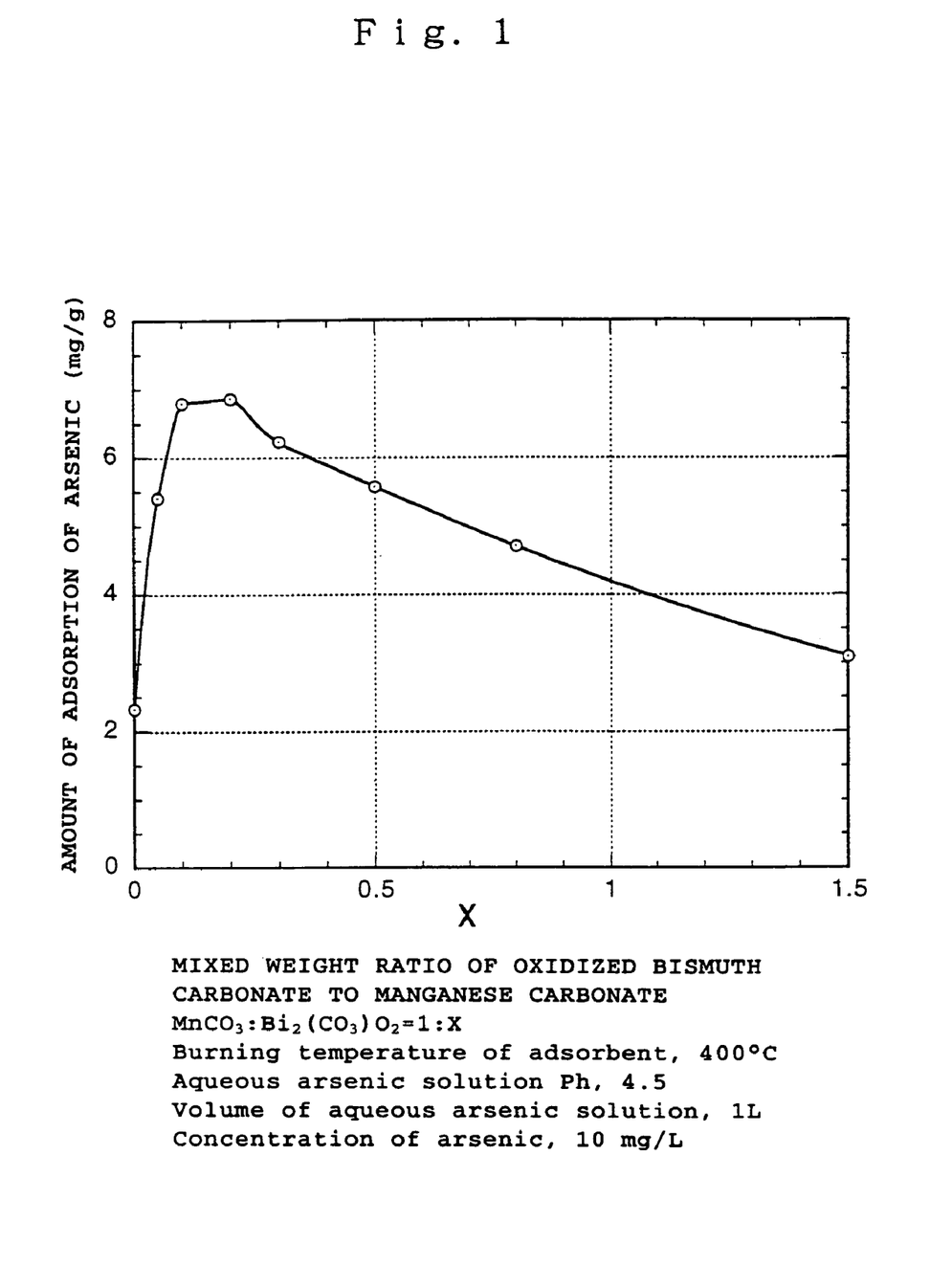
FIG. 1 is a graph showing the relation between the mixing weight ratio of manganese carbonate and oxidized bismuth carbonate, and the amount of adsorption of arsenic.

For synthesizing the arsenic adsorbent, the mixing ratio of manganese carbonate powder ($MnCO_3$, reagent special grade) and oxidized bismuth carbonate powder ($Bi_2(CO_3)O_2$, reagent special grade) were changed as described above to investigate the optimum mixing ratio. The burning temperature was 400° C., and the results are shown in FIG. 1. FIG. 1 shows that the optimum mixing ratio for obtaining the highest amount of adsorption is $MnCO_3:Bi_2(CO_3)O_2$ of about 1:0.1 to 1:0.2 in the mixing weight ratio. On the contrary, the amount of adsorption was extremely decreased in the manganese oxide containing no bismuth added (mixing ratio 1:0) as compared with the oxide in which bismuth is added, indicating that the arsenic adsorption performance is improved by adding bismuth.

Peaks of bismuth oxide and oxidized bismuth carbonate, as well as a broad peak at 2θ of 37° a scribed to amorphous manganese oxide, were observed by confirmation with the X-ray diffraction pattern in the products of burning with the mixing ratio in the range of 1:0.1 to 1:0.2.

(Amount of Adsorption of Arsenic and Burning or Heating Temperature)

Figure 2:
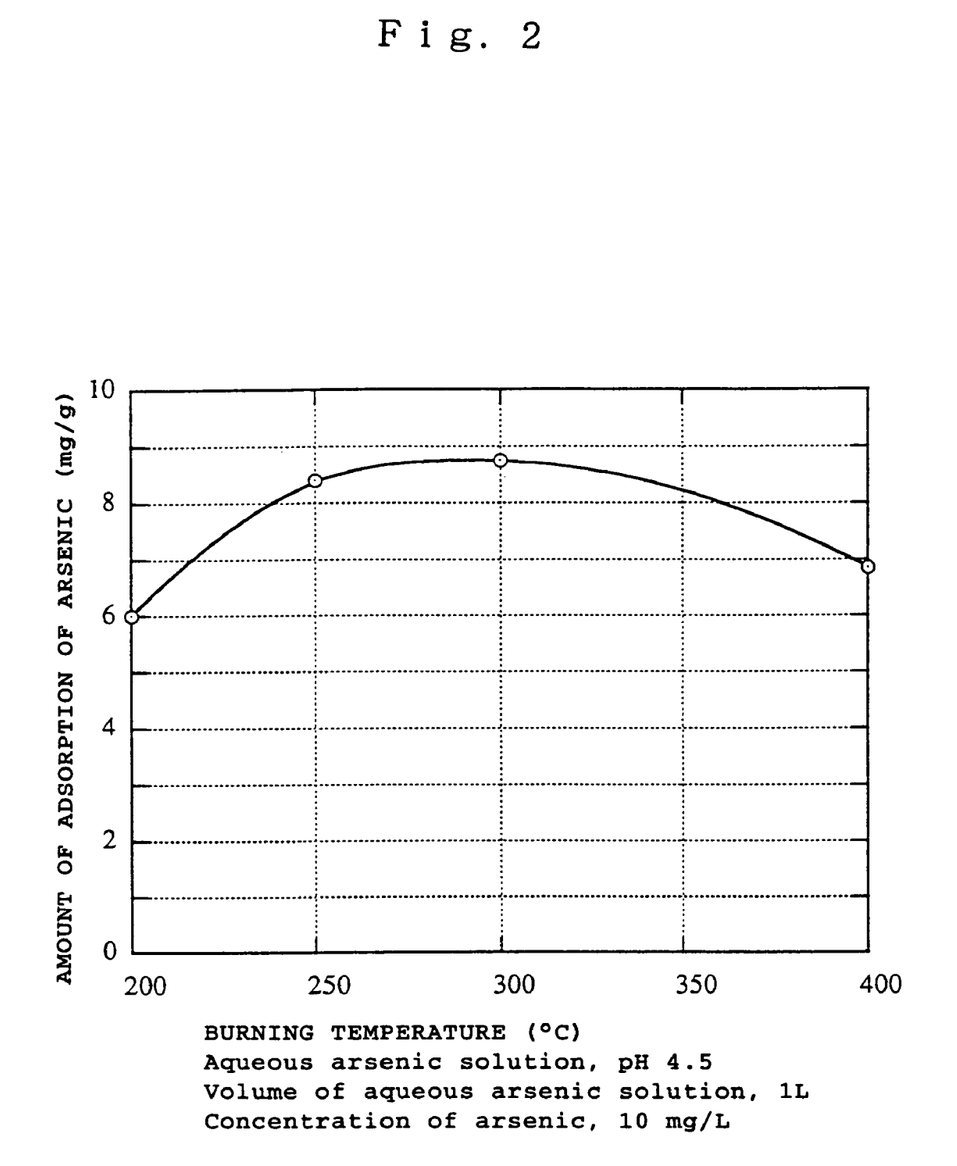
FIG. 2 is a graph showing the relation between the burning temperature and the amount of adsorption of arsenic.
Figure 3:
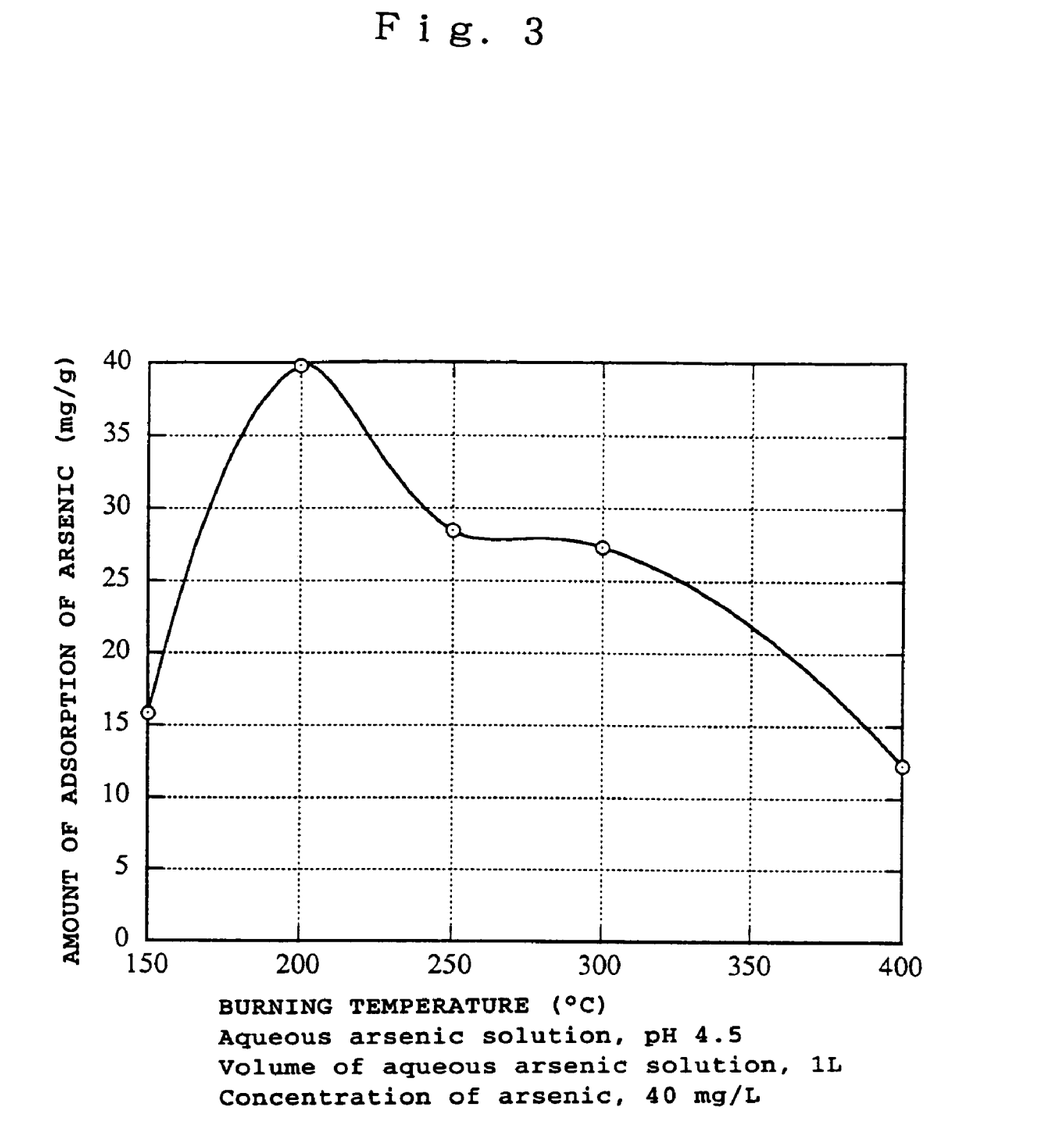
FIG. 3 is a graph showing the relation after correction of the relation in FIG. 2.
Figure 4:
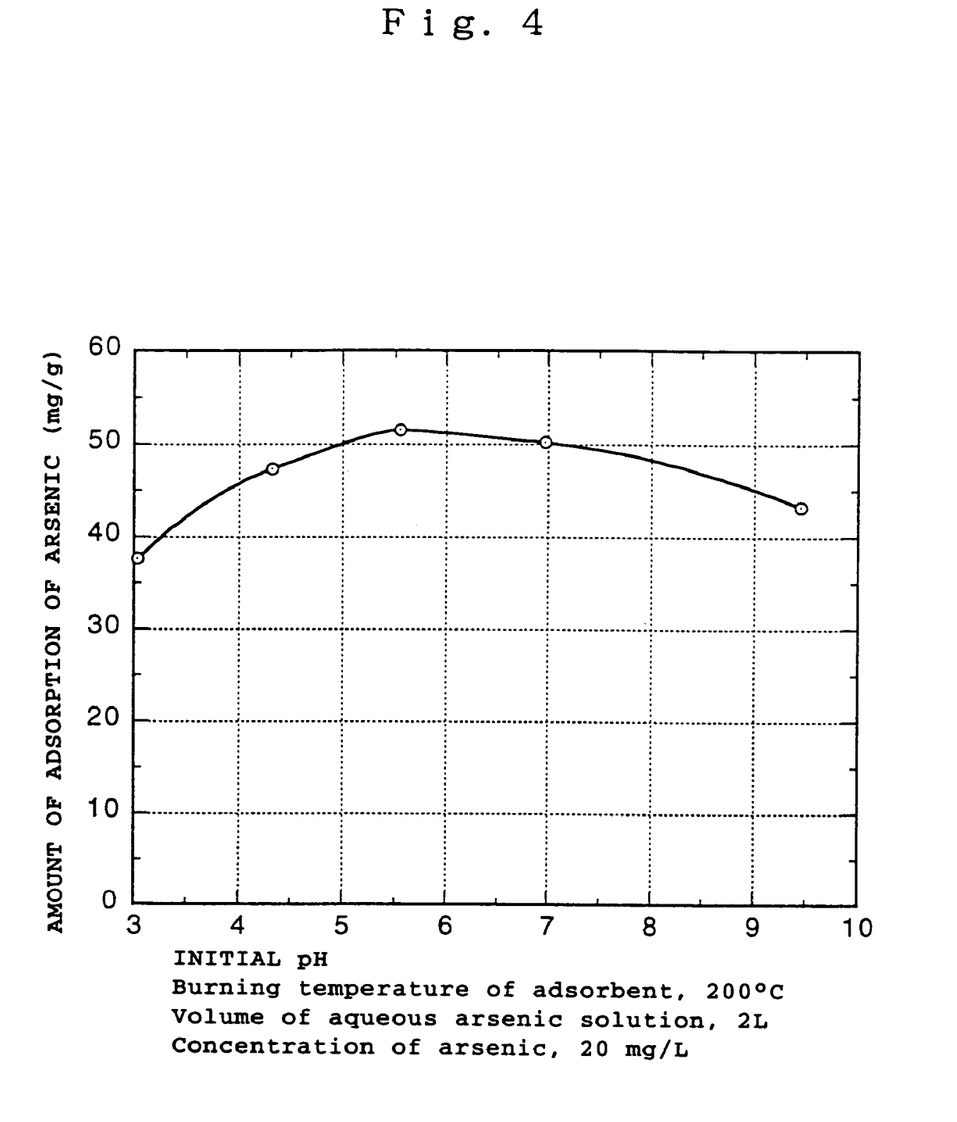
FIG. 4 is a graph showing the relation between initial pH and the amount of adsorption of arsenic.

In the synthesis of the arsenic adsorbent, the change of the amount of adsorbed arsenic to the difference of the temperature was investigated when a mixed powder of manganese carbonate and oxidized bismuth carbonate was heated using an electrical furnace. The results are shown in FIG. 2. FIG. 2 shows that a high amount of adsorption is obtained when the temperature is about 300° C. However, it was found that the weight of the adsorbent was decreased to about one half of the initial weight of 1 g, when the adsorbent suspended in an aqueous arsenic solution was filtered and weighed after completing the adsorption procedure. This decrease of the weight of the adsorbent is supposed to be ascribed to the fact that manganese carbonate as a base reagent material is left behind in the adsorbent obtained after burning or heating, and carbonates are lost by vaporization when the adsorbent is treated with an acid. It was made clear that the adsorbent obtained by burning or heating at 200° C. shows the highest amount of adsorption as shown in FIG. 3, by correcting the results in FIG. 2 considering the weight loss as described above.

(Amount of Adsorption of Arsenic and pH)

The effect of pH of the aqueous solution of the removal object on the amount of adsorption of arsenic was investigated. The result showed that good adsorption of arsenic is attained when pH of the aqueous arsenic solution is weakly acidic. Accordingly, arsenic is considered to be efficiently removed by previously adjusting pH of the aqueous arsenic solution as the object of removal.

(Desorption of Arsenic from the Adsorbent)

Figure 5:
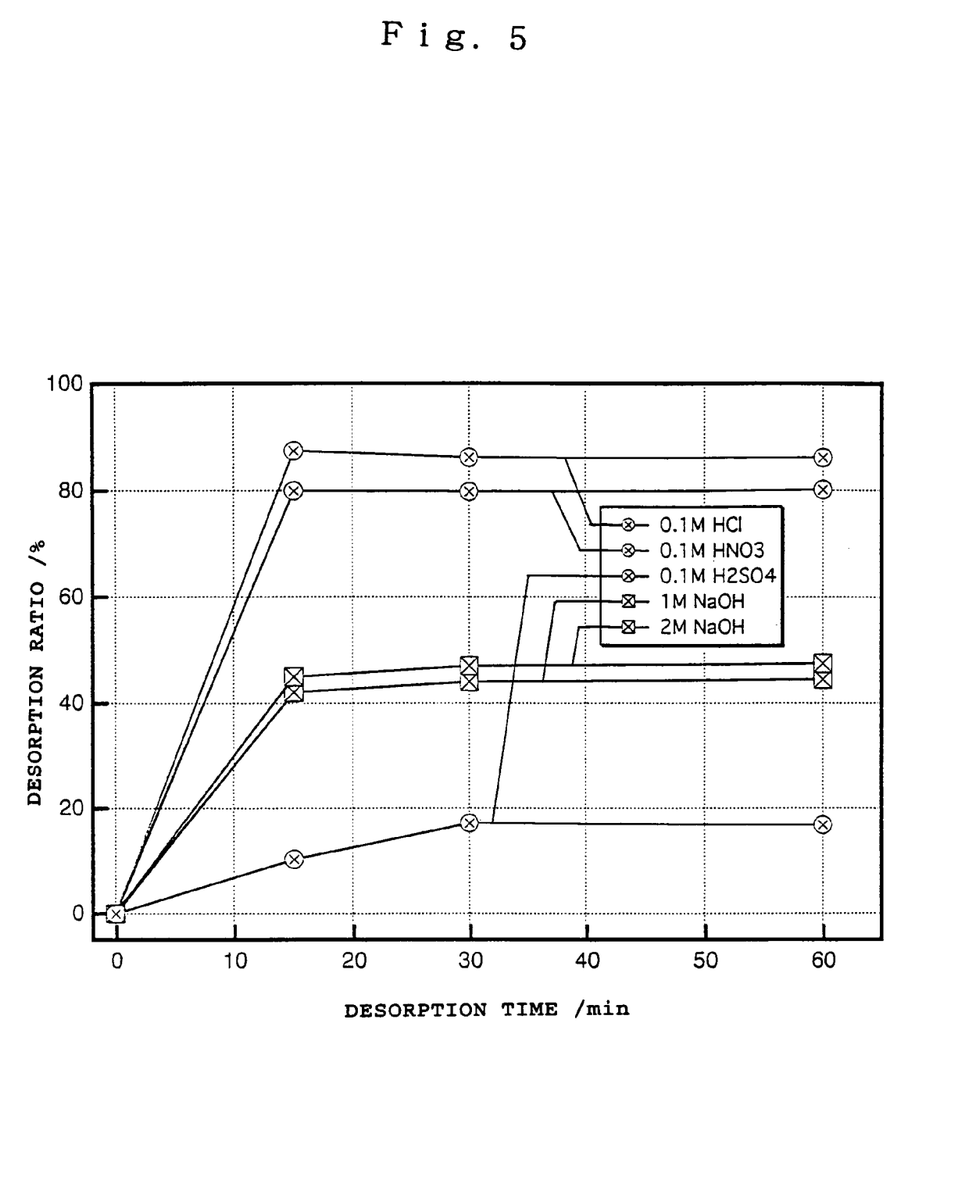
FIG. 5 is a graph showing the relation between the desorption ratio and adsorption time.

Arsenic adsorbed on the adsorbent is efficiently desorbed by allowing the adsorbent to contact an acid such as dilute sulfuric acid. The relation between the kind of the acid solution used for desorption and desorption ratio is shown in FIG. 5. FIG. 5 shows that a high degree of desorption is possible by using dilute hydrochloric acid or dilute sulfuric acid.

(Concentration of Arsenic in Aqueous Solution and Amount of Adsorption of Arsenic)

Figure 6:
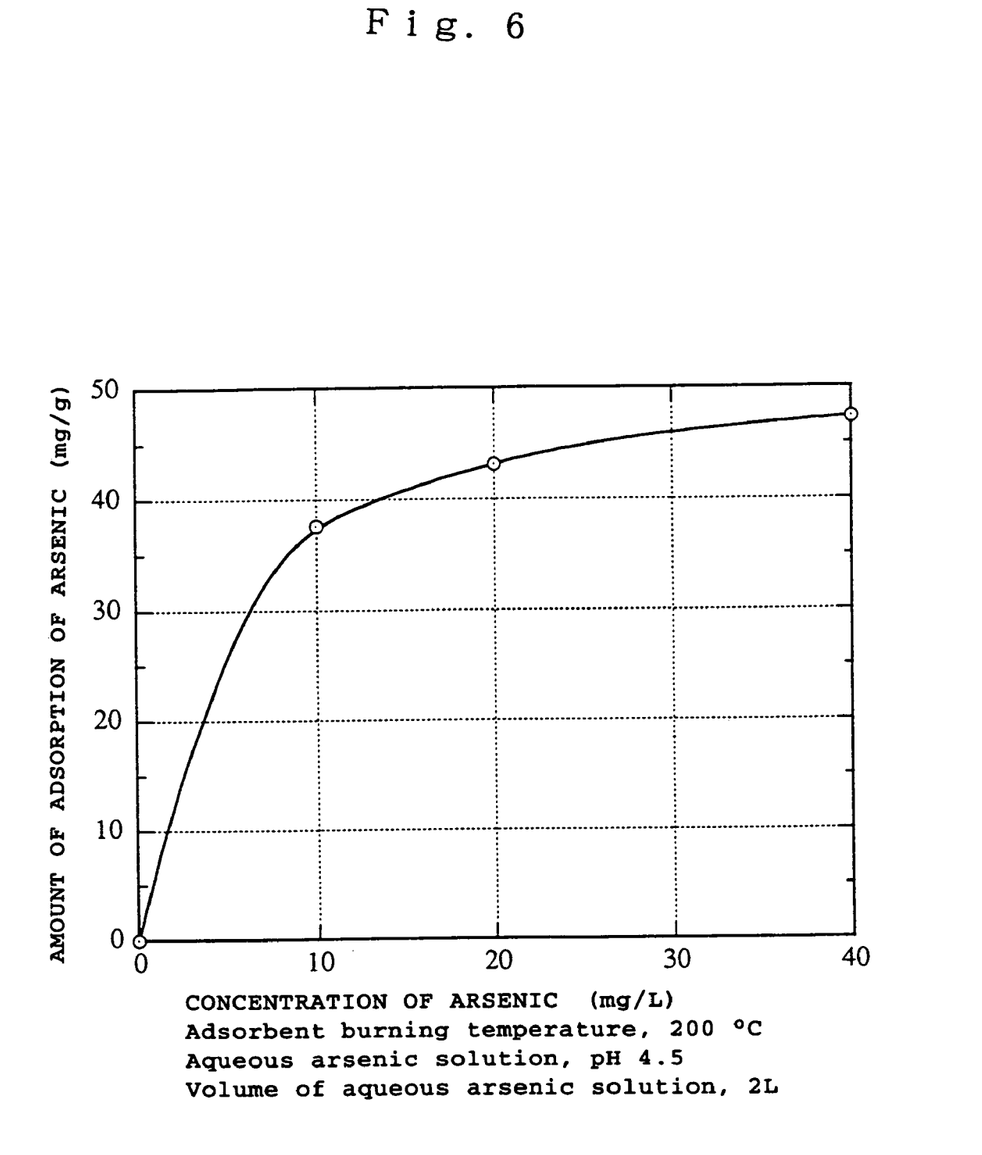
FIG. 6 is a graph showing the relation between the concentration of arsenic in aqueous solution and the amount of adsorption of arsenic.

The effect of the concentration of arsenic in the aqueous solution on the amount of adsorption is shown in FIG. 6. FIG. 6 shows that the amount of adsorption increases as the concentration of arsenic is increased.

(Practical Application to Aqueous Waste Arsenic Solution)

Figure 7:
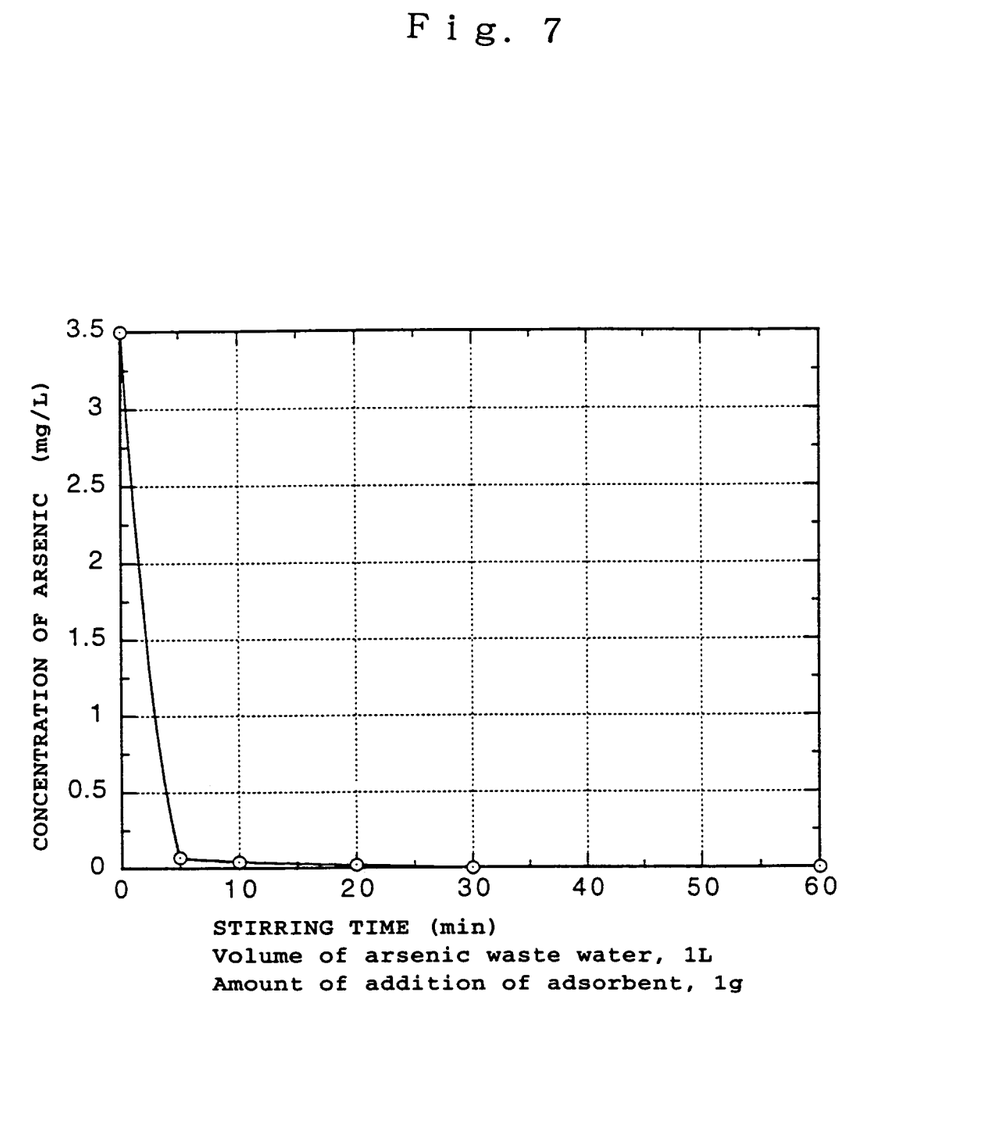
FIG. 7 is a graph showing the relation between the stirring time and the concentration of arsenic.

Effectiveness of the synthesized adsorbent to practical aqueous waste arsenic solution containing trivalent arsenic was confirmed. The object of treatment was waste water from a currently operating geothermal power plant. This waste water contains arsenic in a concentration of 3.5 mg/liter. The component and pH of this waste water are shown in Table 1. Table. 1 shows that this waste water contains many components other than arsenic. In an actual experiment, 1 g of the adsorbent having the mixing ratio of 1:0.2 as described above and burned at 200° C. was treated with an aqueous nitric acid with a concentration of 0.5 mol/liter, and the adsorbent was suspended in 1 liter of waste water with stirring for 1 hour. The results are shown in FIG. 7. FIG. 7 shows that the concentration of arsenic in the waste water was decreased to 0.1 mg/liter or less that is the standard of waste water in a period of as short as 5 minutes from the initial concentration of 3.5 mg/liter. This results shown that the adsorbent of the invention is quite effective for the practical arsenic waste water.

TABLE 1

Components of practical waste water and pH

| Chemical Element | Concentration (mg/l) |
| --- | --- |
| Na | 1790 |
| K | 257 |
| Ca | 28.0 |
| Mg | 0.70 |
| Cl | 2980 |
| $SO_4$ | 144 |
| $HCO_3$ | 23.9 |
| Fe | 4.5 |
| $HBO_3$ | 159 |
| As | 3.50 |
| $T\text{-}SiO_2$ | 667 |
| Li | 10.8 |
| pH | 7.0 |

Example 2

[Retention and Adsorption of Powdery Adsorbent using Ashless Pulp and Glass Wool]

The adsorbent is granulated or retained on a porous carrier to fill in a column, if necessary, for industrial applications, and arsenic is removed by allowing an aqueous arsenic solution to flow through the column.

(1) Method for retaining powdery adsorbent

An appropriate amount of ashless pulp or glass wool with a thickness of about 1 μm was added in pure water with thorough stirring. The diameter of the ashless pulp or glass wool depends on the size of the adsorbent particles to be retained. For example, the diameter of the adsorbent particles as the retention object is 1 to several tens microns. Then, the adsorbent is added to the suspension of ashless pulp or glass wool with additional stirring. An inorganic acid such as hydrochloric acid or nitric acid is added when necessary depending on the property of the adhesive with stirring for a predetermined time. Adding the inorganic acid with stirring activates the surface of the adsorbent particles.

The suspension is added in small portions from the top of a cylinder for preparing an adsorption column when glass wool is used, and the liquid is completely discharged from the bottom of the column with suction using a pump every time for adding the suspension. This procedure is repeated until a desired thickness is obtained to form a retention layer in which the powdery adsorbent is embedded in the glass wool fiber.

When ashless pulp is used, on the other hand, the suspension is poured into the cylinder for preparing an adsorption column from the top of the column. The suspension is stirred with a bar so that the pulp and adsorbent are uniformly precipitated in the column while allowing the liquid to be gradually discharged from the bottom of the column, and a retention layer is formed so that the powdery adsorbent is embedded in the ashless pulp fibers.

(2) Examples Depending on the Retention Method

Examples of treatments of water containing arsenic by applying the retention methods of the invention described above are explained below.

(a) Adsorption Column Method

Figure 8:
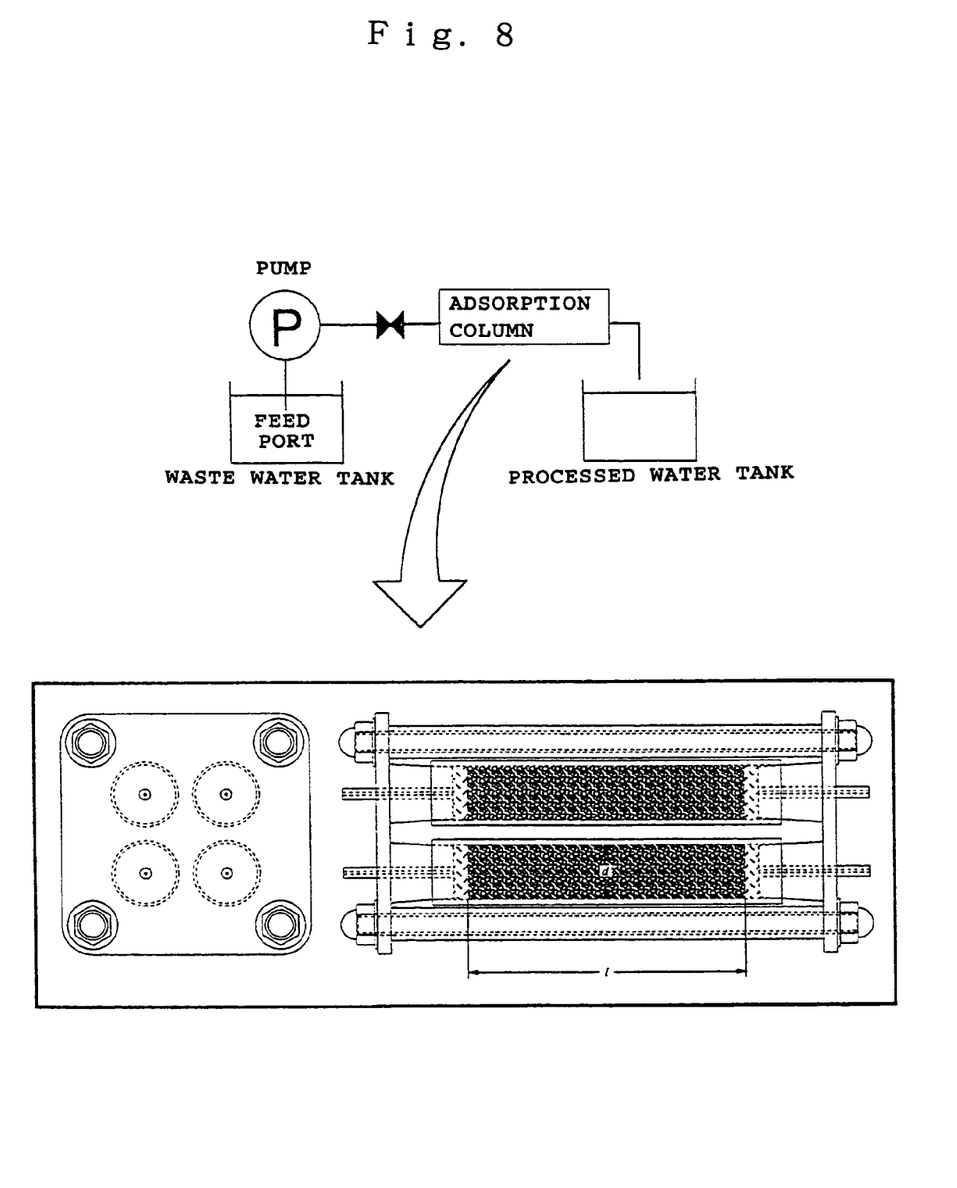
FIG. 8 illustrates an example of waste water treatment using an adsorption column.
Figure 9:
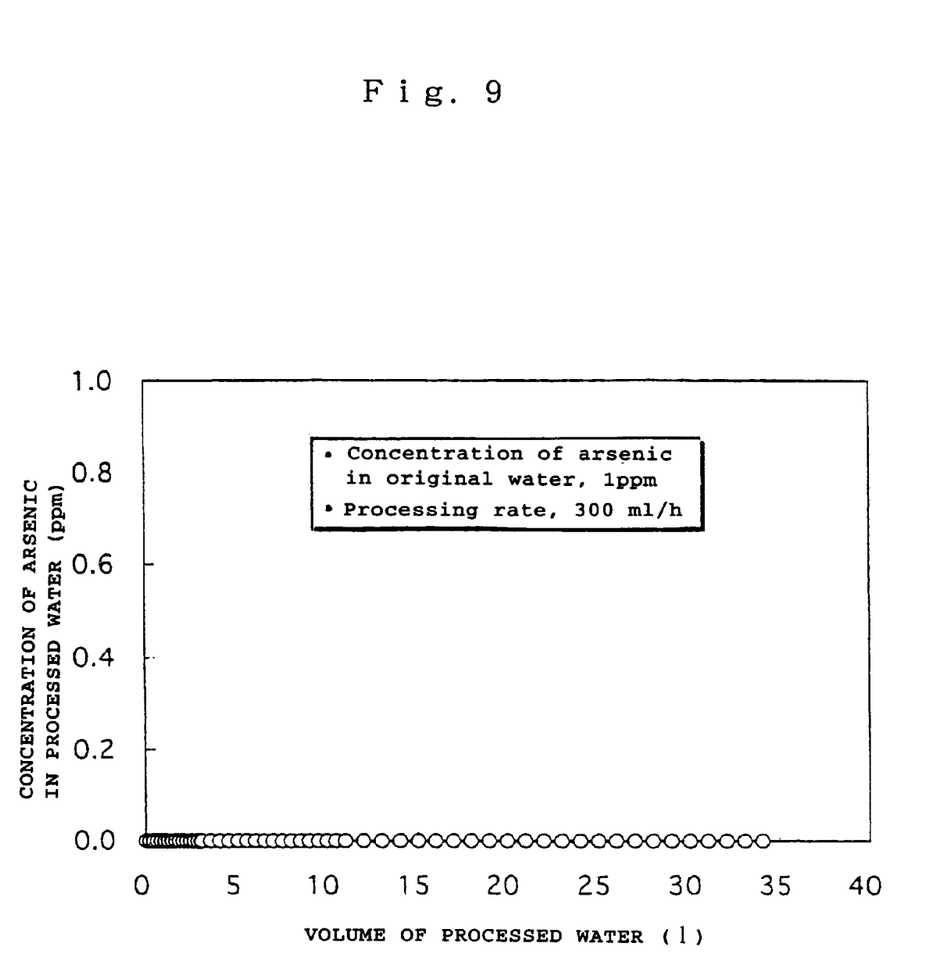
FIG. 9 is a graph showing the result of arsenic waste water treatment by the adsorption column method.

In this method, wastewater containing trivalent arsenic discharged from semiconductor factories is the object of treatment. As shown in FIG. 8, arsenic is removed by injecting wastewater with compression into the column from an waste water tank using a pump. A large volume of wastewater may be continuously processed by this method. A valve is provided between the pump and adsorption column to control the feed rate to the adsorption column. The adsorption column is hermetically sealed to prevent the arsenic adsorbent from contacting the air in order to protect the adsorptive performance of the adsorption column from being deteriorated due to drying of the adsorbent. FIG. 9 shows the experimental results of arsenic wastewater by this method. The results were obtained from experiments by flowing an aqueous arsenic solution with an arsenic concentration of 1 ppm through a cylindrical adsorption column with a diameter of 2 cm and a length of 10 cm at a flow speed of 300 ml/h.

(b) Adsorption Mat Method

This method has been devised as an water cleaning technology for treating serious contamination of drinking water with arsenic occurring in Bangladesh, which is expected as a simple water cleaning method that does not require any electricity at all. The treatment tank shown in FIG. 10 comprises an outer frame equipped with an water tap, an arsenic adsorption mat, and charcoal, sand and gravel that has been used for domestic filtration tank. This device is featured in that the structure is simple and hardly broken, and cleaning of water from arsenic is possible by only supplying the outer frame and adsorption mat to the installation site. The gravel layer and sand layer remove suspended fine particles in water, the charcoal layer removes organic substances, and the adsorption mat to enable safe drinking water to be easily obtained removes arsenic. In addition, the structural feature of the method is that the elevation of the water tap is made to be higher than the installation position of the arsenic adsorption mat so that the adsorption mat is always soaked in water. This enables the adsorbent to be protected from being dried by contacting the air to consequently prevent the performance of the adsorption mat from being deteriorated.

Figure 10:
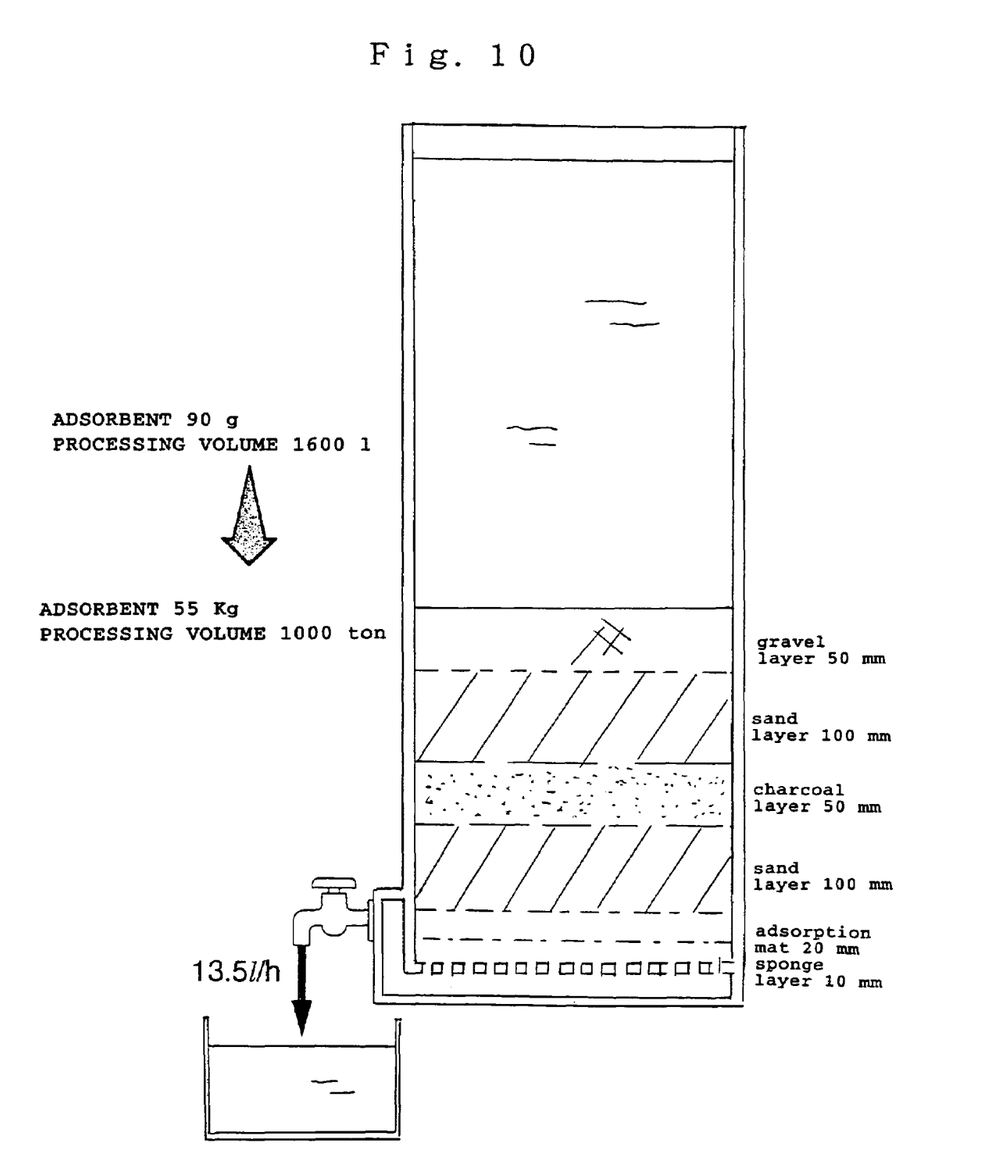
FIG. 10 illustrates an example of a simplified water cleaning method using an adsorption mat.

An arsenic adsorbent previously activated with an inorganic acid is retained on the adsorption mat. The adsorption mat should be hermetically sealed to the air in a sufficiently moist state, and is stored separately from the outer frame. The adsorption mat is transported to the installation site of the device in a hermetically sealed state with a film. The film is peeled immediately before use and is laid in the outer frame, and sand, gravel and charcoal are filled thereon as shown in the drawing.

(c) Adsorption Bag Method

Figure 11:
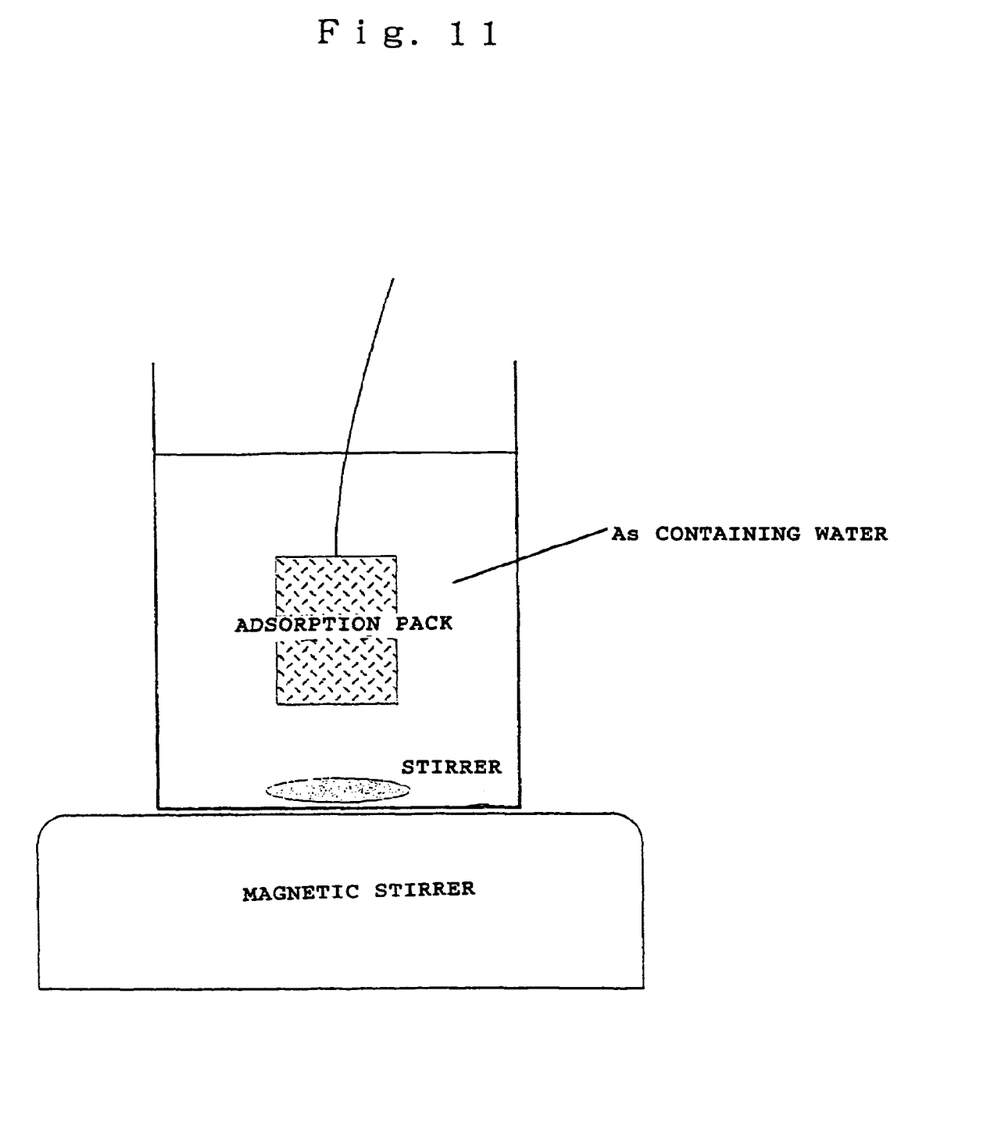
FIG. 11 illustrates an example of a portable water cleaning method using an adsorption pack.

This method was devised as a portable cleaning method of water from arsenic for the purpose of enhancing simplicity and convenience as compared with the method (b). The method is illustrated in FIG. 11. A small amount of glass wool for obtaining good water permeability or fiber of ashless pulp or the like, and the arsenic adsorbent are sealed in an adsorption bag. The bag is placed in water to be treated, and arsenic is removed by adsorption by stirring water to be treated.

Figure 12:
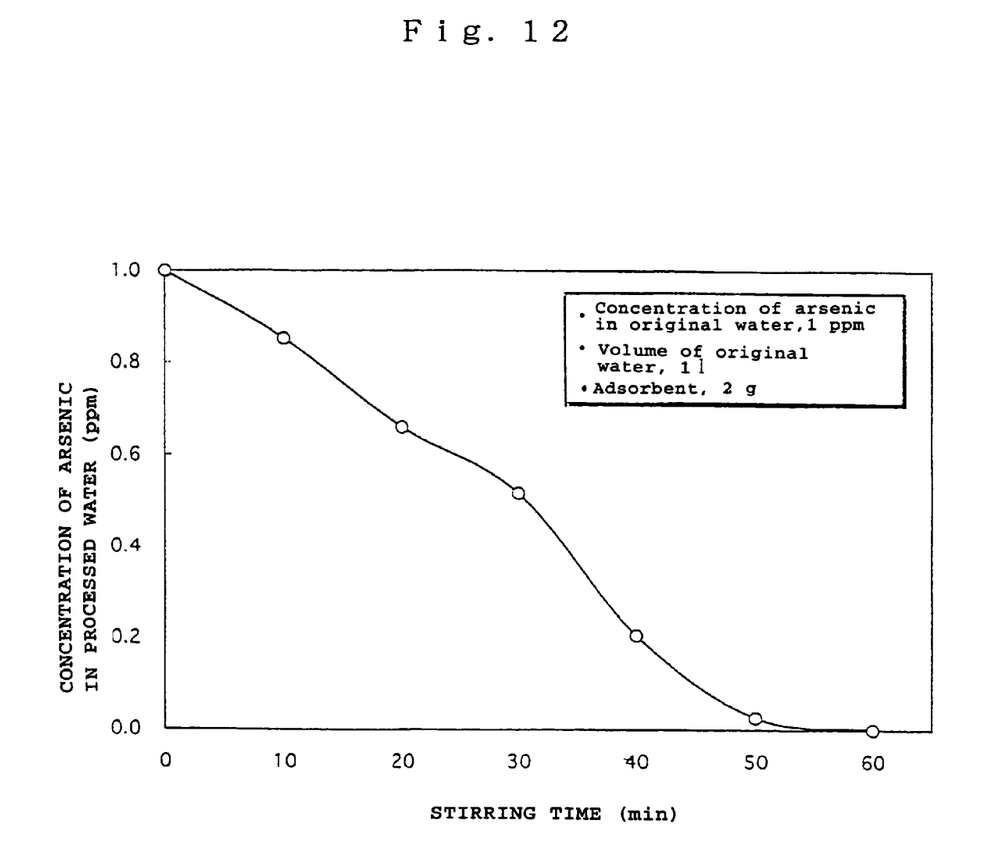
FIG. 12 is a graph showing the result of waste water treatment by an adsorption pack method.

The arsenic adsorbent in the adsorption bag is previously activated with an inorganic acid, and the bag is hermetically sealed in a plastic bag in a moist state. The adsorptive ability of the arsenic adsorbent is sustained for a long period of time by hermetic sealing. Taking the adsorption bag out of the plastic bag by breaking the plastic bag may instantaneously use the adsorbent. FIG. 12 shows the results of use of this method. FIG. 12 shows the decrease of the concentration of arsenic after placing one adsorption bag with stirring in 1 liter of water containing trivalent arsenic.

Example 3

[Removal of Arsenic (Pentavalent Arsenic) from Industrial Wastewater]

(Experimental Wastewater)

Arsenic (V) was removed from practical industrial waste water having the compositions shown in Table 2 using an adsorbent having a mixing weight ratio of 1:0.2 as described previously and burned at 200° C. The arsenic concentration of waste water was 0.028 mg/liter, which exceeds the environmental standard of 0.01 mg/liter. Arsenic in this wastewater was confirmed to be arsenic acid from the measurement of the redox potential.

TABLE 2

| component | concentration (mg/l) |
|---|---|
| As | 0.028 |
| Mo | 310 |
| V | 2.5 |
| Pb | 0.3 |
| Cd | 0.1 |
| Cr | 0.1 |
| Se | 0.3 |
| Mn | 3.4 |
| Zn | 0.1 |
| Cu | 0.1 |
| P | 1.0 |
| Fe | 0.1 |
| Al | 1.3 |
| $NH_4$—N | 1980 |
| $NO_3$—N | 850 |
| Na | 3720 |
| Mg | 6800 |
| Ca | 140 |
| S | 9495 |
| Cl | 6750 |
| pH | 7.8 |

(Experimental Conditions)

The adsorbent (1.44 g) after an acid treatment with 0.5N nitric acid was suspended in 1 liter of experimental waste water. Samples of experimental waste water were sampled by filtration at every time lapse of 5, 15, 30, 60 and 120 minutes after suspending the adsorbent. The changes of arsenide concentration in experimental waste water were investigated using an ICP atomic emission analyzer equipped with a hydride compound generator, which is a higher analytical sensitivity than conventional ICP atomic emission analyzer.

(Experimental Results)

Figure 13:
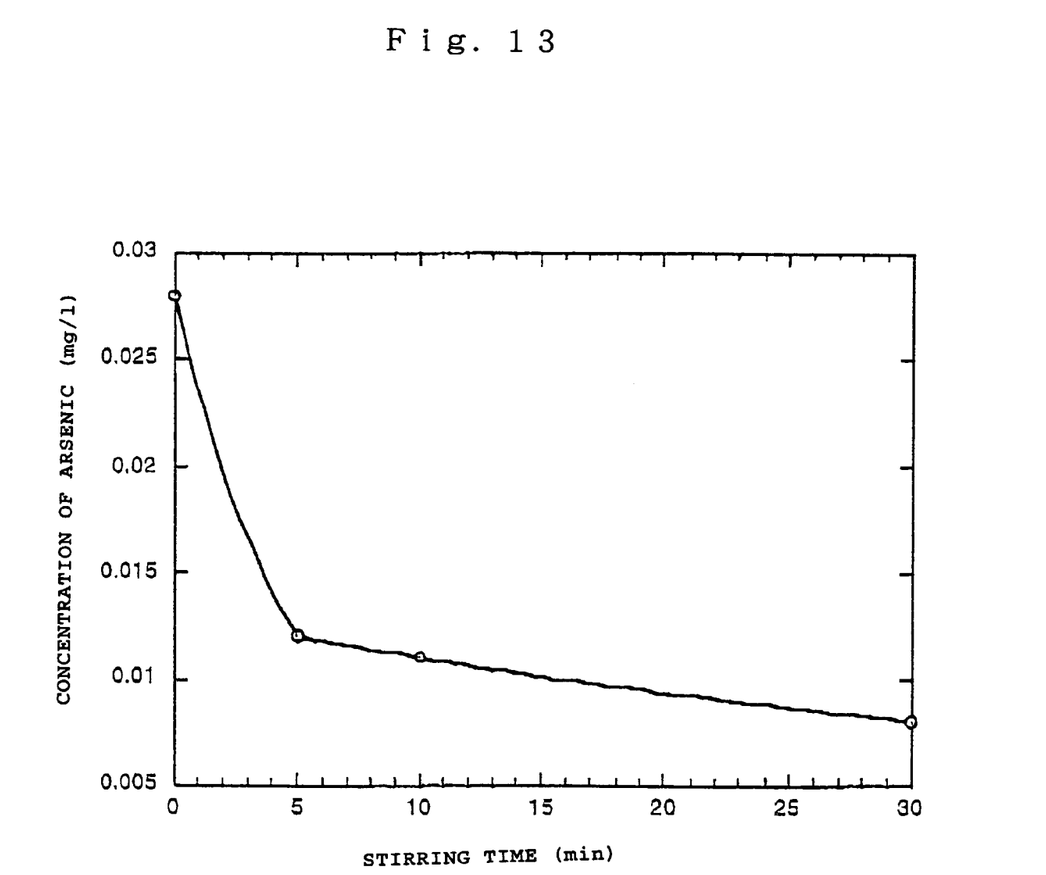
FIG. 13 is a graph showing the result of treatment of pentavalent arsenic containing waste water.

As shown in FIG. 13, the concentration of arsenic was decreased with the time lapse of stirring as indicated in the vertical axis, and reached to a level below the environmental standard of 0.01 mg/liter 30 minutes after suspending the adsorbent. It was confirmed that the adsorbent of the invention is also effective for removing arsenic (V) in practical industrial waste water in which various other components exist together as shown in Table 2.

Example 4

[Removal of Arsenic from Artificial Arsenic (V) Waste Water]

(Experimental Waste Water)

Artificial waste water (3 liters) of arsenic (V) was prepared by dissolving a reagent ($Na_2HAsO_4$) in pure water. The concentration of arsenic was 10 mg/liter, and the solution was adjusted to pH 7 by adding an aqueous sodium hydroxide solution.

(Experimental Conditions)

After treating 1 g of the adsorbent in Example 3 with 0.5N nitric acid for 30 minutes, the adsorbent was washed with pure water, and suspended in experimental waste water with stirring for 1 hour.

(Experimental Results)

The concentration of arsenic in experimental waste water after a time lapse of 1 hour was determined with an ICP atomic emission analyzer, and was found to be decreased to 7.2 mg/liter. The weight of the adsorbent recovered from experimental waste water by filtration was 0.5 g. The amount of adsorption of arsenic (V) per unit weight of the adsorbent was calculated to be 16.8 mg/g. The value was almost comparable to the experimental result obtained by using an artificial arsenic waste water containing arsenic (III) prepared using a reagent $As_2O_3$, showing that the adsorbent of the invention is an effective adsorbent for trivalent arsenic as well as for pentavalent arsenic.

INDUSTRIAL APPLICABILITY

As hitherto described in detail, the present invention provides a new technology that enables pentavalent arsenic as well as trivalent arsenic that has been considered to be difficult to remove to be efficiently removed from waste water.

The invention claimed is:

1. A manganese oxygen compound with pentavalent or trivalent arsenic sorbability which is a product of burning or heating which consists of an oxygen compound of bismuth and an oxygen compound of manganese and contains manganese as a major component, wherein the molar mixing ratio of the compound of bismuth and the compound of manganese is in the range of 0.01:1 to 1:1.

2. The manganese oxygen compound with pentavalent or trivalent arsenic sorbability according to claim 1, wherein a compound of manganese in which a compound of bismuth is added is burned or heated in the atmosphere or an atmosphere containing oxygen.

3. The manganese oxygen compound with pentavalent or trivalent arsenic sorbability according to claim 1, wherein a mixture of oxidized bismuth carbonate powder and manganese carbonate powder is burned or heated at a temperature of 150° C. to 400° C.

4. An arsenic adsorbent comprising the oxygen compound of manganese according to claim 1, or a compound containing the oxygen compound of manganese.

5. A method of adsorption and removal of arsenic in solution which comprises, contacting an arsenic adsorbent according to claim 4 and an aqueous arsenic solution, and adsorbing and removing arsenic contained in solution.

6. A method of reclaiming the arsenic adsorbent of claim 5 which comprises, performing an acid treatment on the arsenic adsorbent which adsorbed arsenic, making arsenic desorb into an acid solution, and recovering the arsenic adsorbent.

7. An arsenic adsorbent comprising the manganese oxygen compound according to claim 1 retained on or filled in a carrier substance.

8. A method of adsorption and removal of arsenic in solution which comprises, contacting an arsenic adsorbent according to claim 7 and an aqueous arsenic solution, and adsorbing and removing arsenic contained in solution.

9. A method of reclaiming the arsenic adsorbent of claim 8 which comprises, performing an acid treatment on the arsenic adsorbent which adsorbed arsenic, making arsenic desorb into an acid solution, and recovering the arsenic adsorbent.

10. A process for producing the manganese oxygen compound with pentavalent or trivalent arsenic sorbability according to claim 1, which comprises mixing a base material for the oxygen compound of bismuth and a base material for the oxygen compound of manganese for forming the manganese oxygen compound, and burning or heating the base materials.

11. The process according to claim 10, wherein the base materials are burned or heated at a temperature of 150°C. to 400°C.

12. The process according to claim 10, which further comprises treating the product of burning or heating with an acid.

13. The manganese oxygen compound with pentavalent or trivalent arsenic sorbability according to claim 1, wherein the product of burning or heating is an acid-treated product.

* * * * *